United States Patent [19]

Frania et al.

[11] Patent Number: 4,718,522
[45] Date of Patent: Jan. 12, 1988

[54] AUTOMATIC ADJUSTMENT APPARATUS FOR A VEHICLE BRAKE LEVER OF A BRAKE

[75] Inventors: Josef Frania, Hanover; Jorg Vanselow, Ronnenberg, both of Fed. Rep. of Germany

[73] Assignee: WABCO Westinghouse Fahrzeugbremsen GmbH, Hanover, Fed. Rep. of Germany

[21] Appl. No.: 902,734

[22] Filed: Sep. 2, 1986

[30] Foreign Application Priority Data

Sep. 21, 1985 [DE] Fed. Rep. of Germany ....... 3533686

[51] Int. Cl.$^4$ ...................... F16D 51/00; F16D 65/38
[52] U.S. Cl. .......................... 188/79.5 K; 188/196 BA; 74/522; 192/111 A
[58] Field of Search ........ 188/79.5 K, 196 M, 196 D, 188/196 BA; 192/111 A; 74/522

[56] References Cited

U.S. PATENT DOCUMENTS 4,057,128  11/1977  Coupland ...................... 188/79.5 K

FOREIGN PATENT DOCUMENTS 2528603  1/1976  Fed. Rep. of Germany .

Primary Examiner—Andres Kashnikow
Assistant Examiner—Richard Potosnak
Attorney, Agent, or Firm—J. O. Ray, Jr.

[57] ABSTRACT

An automatic adjustment apparatus for the brake lever of a vehicle brake with a worm drive, an adjustment mechanism and a one-way coupling. The automatic adjustment of the brake lever on the brake shaft takes place by means of a one-way coupling. When there is a manual adjustment of the brake lever in the direction of the release of the brake jaws, the one-way coupling can be mechanically disengaged.

8 Claims, 5 Drawing Figures

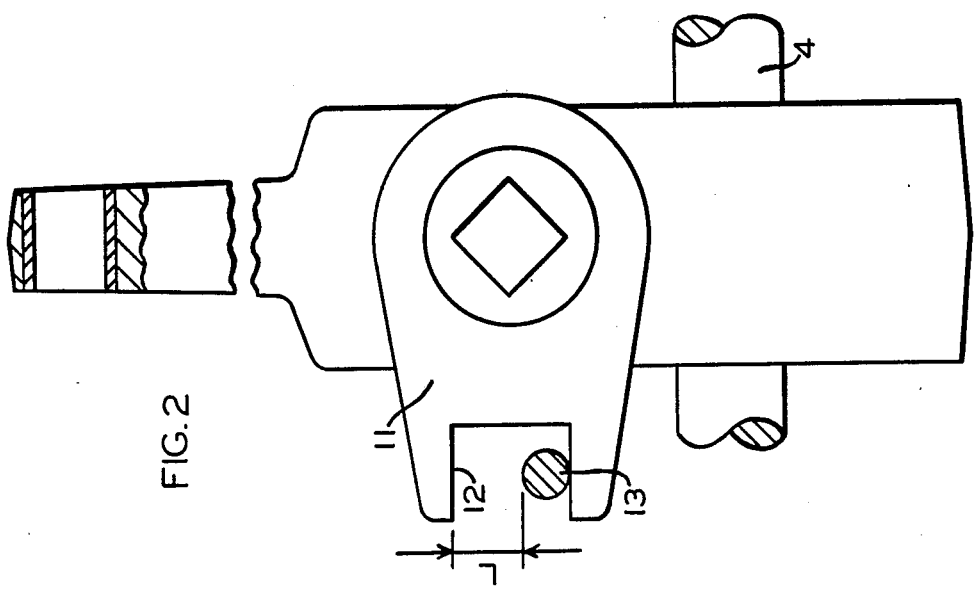
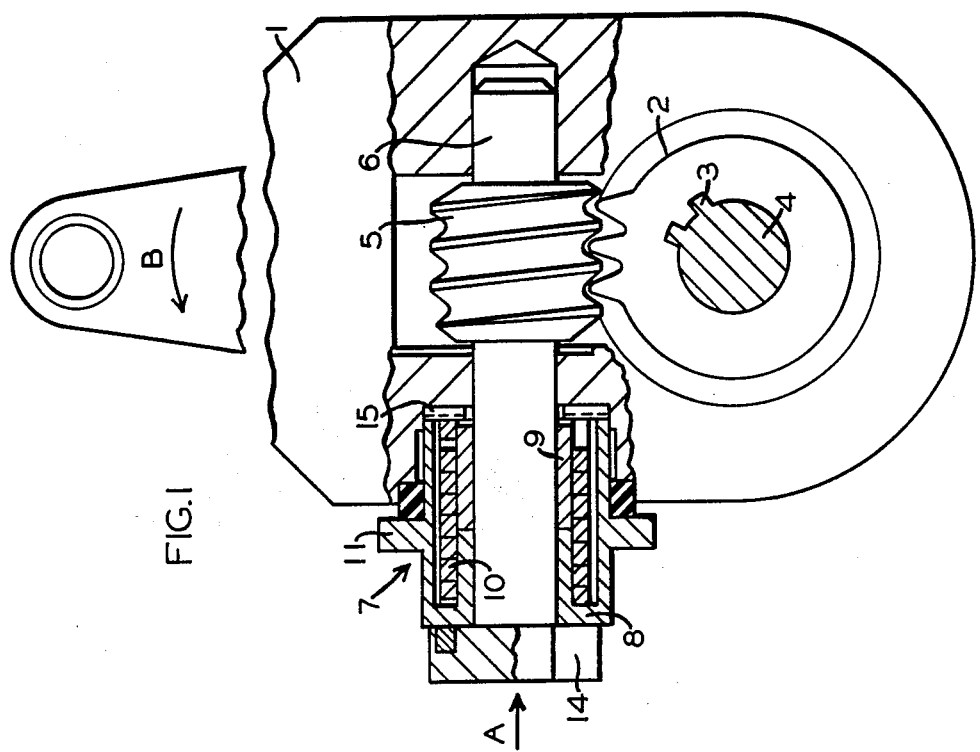

AUTOMATIC ADJUSTMENT APPARATUS FOR A VEHICLE BRAKE LEVER OF A BRAKE

FIELD OF THE INVENTION

The present invention relates, in general, to vehicle brakes and, more partucularly, the invention relates to an apparatus to automatically adjust a roadway-type vehicle brake lever of a brake.

BACKGROUND OF THE INVENTION

One such type apparatus which is available in the prior art is described in German publication DE-PS 25 29 603; this automatic brake adjustment apparatus consists essentially of a worm gear which is in a form-fitting connection with the brake shaft of the vehicle which is engaged with a worm shaft located in a brake lever housing located on the brake shaft.

A drive mechanism having an integrated idle stroke is also located in the housing of the brake lever and is in an active connection with an adjustment mechanism located on the brake lever which is in the form of a lever linkage. The afore-mentioned idle stroke that is integrated in the drive mechanism is in a ratio to a deflection of the brake lever which is proportional to the idle stroke of the brake lining from the starting position until the brake lining comes into contact with the brake drum.

In this prior art brake adjustment apparatus after a specified idle stroke of the drive mechanism, for example. when there is some wear of the brake lining, the worm shaft of the worm drive is rotated by the drive mechanism via a free-wheel device in the form of a one-way coupling. In this manner, the brake lever is thereby adjusted around the axis of the brake shaft. Therefore, the brake shaft is brought into a new starting position relative to an activation mechanism as a function of the wear of the brake lining. The activation mechanism is, for example, a brake cylinder.

The free-wheel device, forming the one-way coupling, comprises a wrap spring in the manner of a coil spring which is located around the longitudinal axis of the worm shaft. Such wrap spring can transmit a turning moment from the drive mechanism to the worm shaft when rotation occurs in the brake adjustment direction.

Such one-way coupling further includes two sleeves located one behind the other on the worm shaft. The two sleeves are surrounded by the wrap spring. A first of these sleeves can be rotated on the worm shaft by the adjustment mechanism as a function of the angular deflection of the brake lever, while the second of these two sleeves can move rotationally in relation to the first sleeve by a specified angle of rotation.

This specified angle of rotation is maintained within its limits by stops which are located between the worm drive and the second sleeve. When the first sleeve rotates in relation to the second sleeve held in place by the worm shaft, in the brake readjustment direction, a friction closing occurs between the outside diameter of the two sleeves and the inside diameter of the wrap spring which is due to the reduction of the diameter of the wrap spring during such rotation. This reduction of the diameter of the wrap spring leads to a compression connection between the two sleeves and the wrap spring. In this manner, a turning moment is established and transmitted from the adjustment apparatus via the blocked coupling which causes a rotation of the worm shaft in the direction of an adjustment of the brakes.

In this prior art adjustment apparatus when the brakes are released, i.e., when there is a relative rotational movement of both sleeves in relation to one another, counter to the adjustment direction, the friction closing disappears so that the one-way coupling can then operate as a free wheel.

The adjustment apparatus allows an adjustment of the brake by hand, for example, for adjustment of the apparatus or when the brake lining is to be changed. For this purpose, the worm shaft can be rotated by an appropriate tool, such as a wrench or a crank. When the worm shaft is rotated in the direction of the loosening of the brake jaws from the brake drum, however, the one-way coupling operates with an increasing friction connection on the wrap spring, in the manner described above in connection with the self-adjustment of the brakes.

Since, however, the turning moment is transmitted in the opposite direction, i.e., from the worm shaft to the adjustment apparatus via the one-way coupling, before the worm shaft is rotated, the force-fit connection between the wrap spring and the two sleeves located on the worm shaft in the manner described above must be overcome. Since the friction closure increases with an increasing turning moment until slipping occurs, undesirable friction fluctuations can occur. These undesirable friction fluctuations may be caused, for example, by variable lubrication conditions or by the manufacturing tolerance of the wrap spring, affecting the tensile force in the winding direction, until the creep limit of the material of the wrap spring is reached. This means that either an undesirable slipping of the worm shaft will be possible, or the wrap spring will rupture.

Of course, the maximum transmissible turning moment can be reduced by a reduction of the friction forces between the wrap spring and the surfaces in a friction closure with it. Such measures, however, would also reduce the minimum transmissible turning moment caused by frictional fluctuations. This could mean that the moment required for the self-adjustment would no longer be available. Ultimately, this would result in a less-precise adjustment of the brakes, or no adjustment at all, caused by a premature slip of the one-way coupling.

SUMMARY OF THE INVENTION

An automatic adjustment apparatus is taught for the brake lever of a brake positioned on a road vehicle. The automatic adjustment apparatus includes a worm gear wheel which can be positioned in a force-tight manner with a brake shaft. The worm gear wheel is engaged with a worm shaft. The worm shaft is located in a brake lever which, in turn, is located on the brake shaft in a position such that the brake lever can pivot around the longitudinal axis of the brake shaft. Around the longitudinal axis of the worm shaft, there is a one-way coupling in the form of a wrap spring. The wrap spring in the closing direction can transmit a drive movement of a drive aparatus to the worm shaft in the direction of a brake adjustment. Positioned between the wrap spring and the brake lever, there is a ratchet which prevents a twisting of the wrap spring around the longitudinal axis of the worm shaft in one direction.

OBJECTS OF THE INVENTION

It is, therefore, one of the objects of the invention to provide an automatic adjustment apparatus for the brake lever of a roadway vehicle brake which, by relatively simple means, will ensure that the turning moment transmitted by the worm shaft to the wrap spring will not exceed a value which can be specified in advance when the distance between the brake jaws and the brake drum increases thereby activating the adjustment apparatus.

Another object of the present invention is to provide an automatic adjustment apparatus for the brake lever of a roadway-type vehicle brake in which the friction force acting between the wrap spring and the worm shaft can be increased so that during the automatic adjustment process greater protection can be provided against a premature slippage of the one-way coupling.

The above and various other objects and advantages of the present invention will become more readily apparent to those persons skilled in the vehicle braking art from the following more detailed description of the invention when such description is taken in conjunction with the several views of the drawings and the appended claims.

BRIEF DESCRIPTION OF THE DRAWINGS

FIG. 1 is a side elevation view partially in cross-section, which shows an automatic adjustment apparatus for the brake lever of a brake which is constructed according to the present invention;

FIG. 2 is a side elevation view partially in cross-section of the apparatus shown in FIG. 1 and in the direction of the arrow;

BRIEF DESCRIPTION OF THE INVENTION

Figure 3:
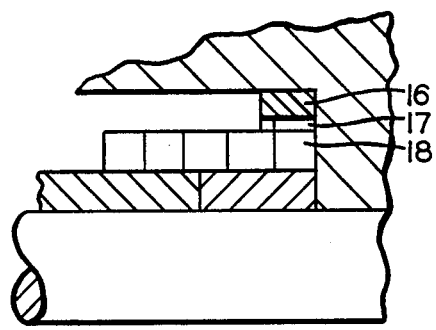
FIG. 3 is a fragmentary view partially in cross-section which shows one form of a ratchet having integral teeth for use with the apparatus of FIG. 1.

When referring to the several views of the drawings, like numerals have been used to identify identical parts throughout.

Now referring more particularlty to FIG. 1, there is illustrated a brake lever 1 connected via a worm gear 2 having a spline profile 3 with a brake shaft 4. The brake shaft 4 can be pivoted in a conventional manner known in the prior art by a limited angular deflection, whereby brake jaws (not shown), which can be moved, preferably by S-cams, can be brought into contact with the brake drum (not shown). The worm gear 2, which is non-rotationally connected with the brake shaft 4, is engaged with a worm 5, the worm shaft 6 of which is mounted so that it can rotate in the brake lever 1. The worm gear 2 is oriented perpendicular to the brake shaft 4. Located on the worm shaft 6, in the manner of a free wheel, is a one-way coupling 7, which consists of a first sleeve 8, mounted so that it can rotate on the worm shaft 6 and a second sleeve 9 connected non-rotationally with the worm shaft 6. There is a wrap spring 10 wound around the outside diameter of the sleeve 8 and 9. The sleeve 8 includes an adjustment lever 11 connected non-rotationally with it, with an adjustment catch 12, which includes an idle play L in relation to a reference point 13 hinged to the vehicle, around which the adjustment lever 11 can pivot freely. (FIG. 2). By means of a molding which is non-rotationally connected with the worm shaft 6, which is suitable for the attachment of a tool, for example, a wrench or a crank, the worm shaft 6 can be turned manually.

Between the housing of the brake lever 1 and the wrap spring 10, there is a ratchet 15, consisting of a ratchet wheel and a ratchet lever arranged in the manner of a toothed ratchet, which prevents a torsional motion of the wrap spring 10 around the longitudinal axis of the worm shaft 6 in relation to the braker lever 1 in one direction. The ratchet 15 is located between the braker lever 1 and the portion of the wrap spring 10 corresponding to the worm shaft 6.

As shown in FIGS. 1 and 3, the ratchet 15 consists of a ratchet wheel 16 connected non-rotationally with the brake lever 1, which consists of a gear wheel with internal teeth, and a ratchet lever 17, which is formed by a wound projection 18 facing the ratchet wheel 16 and projecting radially beyond the outside diameter of the wrap spring 10.

Figure 4:
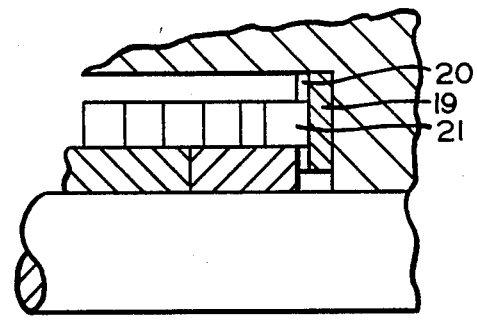
FIG. 4 is a fragmentary view partially in cross-section which shows an alternative form of a ratchet having radial teeth which can be used in the apparatus of FIG. 1.

As shown in FIG. 4, the ratchet 15 consists of a ratchet wheel 19 connected non-rotationally with the brake lever 1, which consists of a toothed disc with radial teeth, and a ratchet lever 20, which is formed by the windings of the wrap spring 10 projecting axially and facing the ratchet wheel 19.

The internal teeth of the ratchet wheel 16 and the radial teeth of the ratchet wheel 19 are designed in the manner of a sawtooth ratchet lever.

The operation of the automatic adjustment apparatus constructed according to the present invention is as follows: When the brake lever 1 with the brake shaft 4 is pivoted in the direction of the arrow B by an activating element, for example, a brake cylinder (not shown) the adjustment catch 12 of the adjustment lever 11 executes the idle stroke L, as long as no adjustment of the brake takes place. As the brake linings wear, the brake stroke from the starting position until contact between the brake linings and the brake drum increases. The result is an increase of the pivot angle of the brake lever 1 and of the adjustment lever 11, which, after executing the idle stroke L, is rotated from the reference point 13 proportional to the increased pivoting angle of the brake lever 1. The winding direction of the wrap spring 10, however, is oriented so that the one-way coupling 7 does not transmit the pivoting of the adjustment lever 11 during the brake application stroke to the worm shaft 6, i.e., the one-way coupling 7 moves in the free-wheel direction.

When the brake lever 1 returns to the starting position, the adjustment catch 12 first of all executes the idle stroke L. Then there is a rotation of the adjustment lever 11 back to its initial position, by an angular deflection, by which the adjustment lever 11 was turned during the application stroke, past the idle stroke L. A similar movement of the sleeve 8 in relation to the sleeve 9 which is fastened non-rotationally to the worm shaft 6, similar to that of the adjustment lever 11, takes place in the winding direction of the wrap spring 10, so that there is a friction closing between the outside diameters of the sleeves 8 and 9 and the inside diameter of the wrap spring 10, which increases until there is a compression connection between the sleeves 8 and 9 and the wrap spring 10, which increases until there is a compression connection between the sleeves 8 and 9 and the wrap spring 10, by means of the blocked one-way coupling 7, the adjustment lever 11 will transfer the angular deflection beyond the idle stroke, in the direction of an adjustment movement, to the worm shaft 6.

The worm shaft 6 can be, when necessary, manually rotated by the application of a tool, for example, a wrench or a crank, on the molding 14. Such manual rotation may be required when changing brake shoes, for example. The brake lever 1, as a function of the direction of rotation of the worm shaft 6, can be pivoted by rolling the worm shaft 6 on the worm gear 2, either in the brake application direction, or the brake release direction, in relation to the brake shaft 4.

When the worm shaft 6 is turned in the brake release direction, and the adjustment catch 12 contacts the reference point 13, the wrap spring 10 tends to pull the sleeves 8 and 9 together in the winding direction, so that an increase of the turning moment would result from the increased friction connecting between the inside diameter of the wrap spring 10 and the outside diameter of the sleeves 8 and 9. This is prevented, however, because the ratchet 15 acts against the winding direction of the wrap spring 10. The ratchet lever 17, 20 of the wrap spring 10 engages the ratchet wheel 16 and the ratchet wheel 19, which prevents a reduction of the inside diameter of the wrap spring 10 and thus a friction closing on the sleeves 8 and 9 if there is a further rotation of the worm shaft 6 in the brake release direction. The one-way coupling 7 disengage din this manner does not offer any resistance to a manual adjustment of the worm shaft 6 in the brake release direction.

During a manual adjustment of the worm shaft 6 in the brake application direction, the one-way coupling 7 acts in the free-wheel direction, i.e., the sleeve 9 is rotated against the winding direction of the wrap spring 10, so that there is an expansion of the wrap spring 10.

During an automatic adjustment of the worm shaft 6 by the adjustment lever 11 by means of the one-way coupling 7, the ratchet 15 is not effective. During this adjustment process, the ratchet lever 17,20 of the wrap spring 10, which is being compressed in the winding direction, jumps over the sawtooth serration of the ratchet wheel 16,20.

Figure 5:
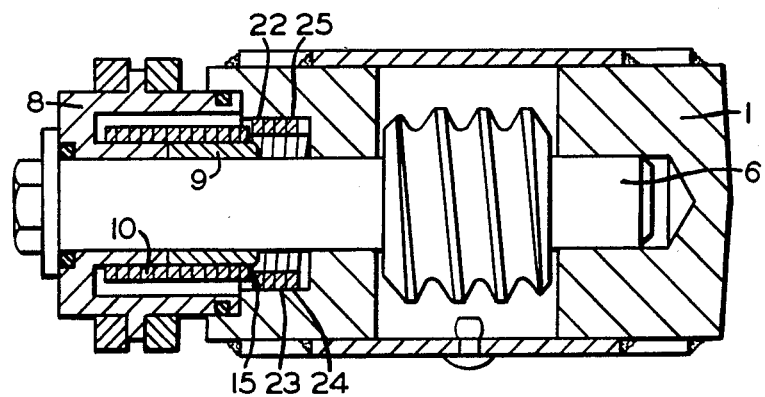
FIG. 5 is a fragmentary view partially in cross-section which shows a silent ratchet which can be used in the apparatus of FIG. 1.

As shown in FIG. 5, the ratchet 15 which acts between the housing of the brake lever 1 and the wrap spring 10 is designed as a silent ratchet. If the rotation of the worm shaft 6 in the brake release direction is prevented, the silent ratchet, like the toothed ratchet described in FIGS. 1, 3, and 4, prevents a contraction of the wrap spring 10 on the sleeves 8 and 9.

The silent ratchet consists of a hole 25 located around the longitudinal axis of the worm shaft 6, with a first friction surface 22 and a friction part 23 connected with the wrap spring 10, which faces a second friction surface 24.

The friction part 23 is formed by a part of the end windings of the wrap spring 10 toward the brake lever 1. The winding diameter at this end is larger than the other parts of the windings of the wrap spring 10, which is in an active connection with the sleeves 8 and 9 in the manner described. The second friction surface 24 is formed by the external top surface of the friction part 23.

Rotating the worm shaft 6 in the brake release direction causes an increase of the turning moment as the result of an increased friction connection between the friction surfaces 22 and 24. Consequently, an increased friction closing between the inside diameter of the wrap spring 10 and the outside diameter of the sleeves 8 and 9 is prevented.

While the presently preferred embodiments of the invention have been described in detail above, it should be understood by those persons skilled in the vehicle braking art that other modifications and adaptations can be made without departing from the spirit and scope of the appended claims.

We claim:

1. An automatic adjustment apparatus for adjusting a braker lever of a brake positioned on a road vehicle, said automatic adjustment apparatus comprising:
   (a) a brake lever positioned for pivotal movement around a longitudinal axis of a brake shaft;
   (b) a worm shaft positioned substantially in said brake lever;
   (c) a worm gear wheel closable in a force-tight manner with said brake shaft and engaged with said worm shaft;
   (d) a one-way coupling including a wrap spring positioned around a longitudinal axis of said worm shaft which in a closing direction can transmit a drive movement of a drive apparatus to said worm shaft in a brake adjustment direction; and
   (e) a ratchet means positioned between a portion of said wrap spring of said one-way coupling and said brake lever for preventing a torsional motion of said wrap spring around said longitudinal axis of said worm shaft in one direction, said ratchet means including;
      (i) a toothed ratchet having a ratchet wheel positioned around said longitudinal axis of said worm shaft and connected rotationally with said brake lever; and
      (ii) a ratchet lever formed by a protruding winding of said wrap spring facing said ratchet wheel.

2. An automatic adjustment apparatus, according to claim 1, wherein said ratchet means prevents said torsional motion of said wrap spring around said longitudinal axis of said worm shaft in said one direction when there is a rotational movement of said worm shaft in a direction which increases a distance of a brake jaw from a brake drum.

3. An automatic adjustment apparatus, according to claim 1, wherein said ratchet wheel includes a toothed rim having internal teeth.

4. An automatic adjustment apparatus, according to claim 1, wherein said ratchet wheel includes a toothed disc having radial teeth which face said protruding winding of said wrap spring.

5. An automatic adjustment apparatus, according to claim 1, wherein said ratchet means is positioned between said brake lever and a portion of said wrap spring corresponding to said worm shaft.

6. An automatic adjustment apparatus for adjusting a brake lever of a brake positioend on a road vehicle, said automatic adjustment apparatus comprising:
   (a) a brake lever positioned for pivotal movement around a longitudinal axis of a brake shaft;
   (b) a worm shaft positioned substantially in said brake lever;
   (c) a worm gear wheel closable in a force-tight manner with said brake shaft and engaged with said worm shaft;
   (d) a one-way coupling including a wrap spring positioned around a longitudinal axis of said worm shaft which in a closing direction can transmit a drive movement of a drive apparatus to said worm shaft in a brake adjustment direction; and (e) a silent ratchet means formed by an enlarged portion of said wrap spring adjacent an end and positioned between a portion of said wrap spring of said one-way coupling and said brake lever for preventing a torsional motion of said wrap spring around said longitudinal axis of said worm shaft in one direction, said silent ratchet means including:
  (i) a first friction surface located in said brake lever around said longitudinal axis of said worm shaft; and
  (ii) a second friction surface formed by an enlarged portion of said wrap spring engageable with said first friction surface.

7. An automatic adjustment apparatus, according to claim 6, wherein said friction portion consists of said wrap spring an outer surface of which forms said second friction surface.

8. An automatic adjustment apparatus, according to claim 6, wherein said first friction surface consists of an aperture in said brake lever located around said friction portion.

* * * * *